United States Patent
Halverson et al.

(10) Patent No.: US 8,972,378 B2
(45) Date of Patent: Mar. 3, 2015

(54) FORMULATING GLOBAL STATISTICS FOR DISTRIBUTED DATABASES

(71) Applicant: Microsoft Corporation, Redmond, WA (US)

(72) Inventors: Alan Dale Halverson, Verona, WI (US); Eric R. Robinson, Madison, WI (US); Srinath Shankar, Madison, WI (US); Jeffrey F. Naughton, Madison, WI (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/656,760

(22) Filed: Oct. 22, 2012

(65) Prior Publication Data

US 2014/0114950 A1    Apr. 24, 2014

(51) Int. Cl.
*G06F 17/30* (2006.01)

(52) U.S. Cl.
USPC ........... 707/713; 707/714; 707/715; 707/716; 707/717; 707/718

(58) Field of Classification Search
CPC ................................ G06F 17/00; G06F 17/30
See application file for complete search history.

(56) References Cited

U.S. PATENT DOCUMENTS

| | | | |
|---|---|---|---|
| 6,865,567 B1* | 3/2005 | Oommen et al. ................ | 1/1 |
| 7,007,039 B2* | 2/2006 | Chaudhuri et al. ............. | 1/1 |
| 7,509,311 B2* | 3/2009 | Galindo-Legaria et al. ...... | 1/1 |
| 8,447,769 B1* | 5/2013 | Paris et al. ............... | 707/758 |
| 8,497,983 B2* | 7/2013 | Cowburn et al. ............ | 356/71 |
| 8,572,122 B2* | 10/2013 | Cras et al. ............... | 707/791 |
| 8,626,749 B1* | 1/2014 | Trepetin et al. ............ | 707/722 |
| 8,635,204 B1* | 1/2014 | Xie et al. ................. | 707/709 |
| 8,645,429 B1* | 2/2014 | Bik et al. ................. | 707/798 |
| 8,682,907 B1* | 3/2014 | Yang et al. ............... | 707/750 |
| 8,694,474 B2* | 4/2014 | Wu ....................... | 707/693 |
| 8,812,488 B2* | 8/2014 | Bamba et al. ............. | 707/718 |
| 8,819,008 B2* | 8/2014 | Rose ..................... | 707/733 |
| 8,819,024 B1* | 8/2014 | Toderici et al. ............ | 707/740 |
| 8,825,682 B2* | 9/2014 | Kishi et al. ............... | 707/758 |

(Continued)

OTHER PUBLICATIONS

Cormode, Graham, et al., "Histograms and Wavelets on Probabilistic Data," IEEE, Jun. 5, 2008, pp. 1-24.*
Matias, Yossi, et al., "Dynamic Maintenance of Wavelet-Based Histograms." ACM, 2000, Proceedings of the 26th VLDB Conference, pp. 1-10.*

(Continued)

*Primary Examiner* — Farhan Syed
(74) *Attorney, Agent, or Firm* — Nicholas Chen; Kate Drakos; Micky Minhas

(57) ABSTRACT

The present invention extends to methods, systems, and computer program products for formulating global statistics for parallel databases. In general, embodiments of the invention merge (combine) information in multiple compute node level histograms to create a global histogram for a table that is distributed across a number of compute nodes. Merging can include aligning histogram step boundaries across the compute node histograms. Merging can include aggregating histogram step-level information, such as, for example, equality rows and average range rows (or alternately equality rows, range rows, and distinct range rows), across the compute node histograms into a single global step. Merging can account for distinct values that do not appear at one or more compute nodes as well as distinct values that are counted at multiple compute nodes. A resulting global histogram can be coalesced to reduce the step count.

20 Claims, 4 Drawing Sheets

(56) References Cited

U.S. PATENT DOCUMENTS

| | | | |
|---|---|---|---|
| 2006/0218128 A1* | 9/2006 | Muras | 707/3 |
| 2007/0165208 A1* | 7/2007 | Cowburn et al. | 356/71 |
| 2008/0027913 A1* | 1/2008 | Chang et al. | 707/3 |
| 2008/0152235 A1* | 6/2008 | Bashyam et al. | 382/224 |
| 2010/0316251 A1* | 12/2010 | Cowburn et al. | 382/100 |
| 2011/0219035 A1* | 9/2011 | Korsunsky et al. | 707/784 |
| 2012/0246189 A1* | 9/2012 | Castellanos et al. | 707/769 |
| 2013/0013574 A1* | 1/2013 | Wu | 707/693 |
| 2013/0124508 A1* | 5/2013 | Paris et al. | 707/723 |
| 2013/0151515 A1* | 6/2013 | Davis et al. | 707/736 |
| 2013/0173591 A1* | 7/2013 | Cras et al. | 707/718 |
| 2013/0173635 A1* | 7/2013 | Sanjeev | 707/748 |
| 2013/0205235 A1* | 8/2013 | Gabara | 715/763 |
| 2013/0254176 A1* | 9/2013 | Davlos | 707/706 |
| 2013/0318069 A1* | 11/2013 | Alu et al. | 707/718 |
| 2013/0346390 A1* | 12/2013 | Jerzak et al. | 707/719 |
| 2014/0006318 A1* | 1/2014 | Xing | 706/12 |
| 2014/0006384 A1* | 1/2014 | Jerzak et al. | 707/719 |
| 2014/0032981 A1* | 1/2014 | Ahmed et al. | 714/49 |
| 2014/0033120 A1* | 1/2014 | Bental et al. | 715/803 |
| 2014/0052711 A1* | 2/2014 | Bamba et al. | 707/718 |
| 2014/0058992 A1* | 2/2014 | Lucey et al. | 706/46 |
| 2014/0081994 A1* | 3/2014 | Becker et al. | 707/749 |
| 2014/0096056 A1* | 4/2014 | Latzina | 715/771 |
| 2014/0101076 A1* | 4/2014 | Martin et al. | 706/11 |

OTHER PUBLICATIONS

Hanson, et al., "Statistics Used by the Query Optimizer in Microsoft SQL Server 2008", Retrieved at <<http://msdn.microsoft.com/en-us/library/dd535534%28v=sql.100%29.aspx>>, SQL Server Technical Article, Feb. 2009, pp. 20.

Schmeling, Holger, "Queries, Damned Queries and Statistics", Retrieved at <<http://www.simple-talk.com/sql/performance/queries,-damned-queries-and-statistics/>>, Oct. 14, 2010, pp. 14.

"Sybase ASE 15 Best Practices: Query Processing & Optimization", Retrieved at <<http://www.sybase_com/files/White_Papers/ASE15-Optimizer-Best-Practices-v1-051209-wp.pdf>>, Technical White Paper, May 2009, pp. 43.

Poosala, et al., "Estimation of Query-Result Distribution and its Application in Parallel-Join Load Balancing", Retrieved at <<http://www.madgik.di.uoa.gr/sites/default/files/vldb96_pp448-459.pdf, In the proceeding of 22nd international conference on Very Large Data Bases, Sep. 3, 1996, pp. 12.

"Optimization Modes and Hints", Retrieved at <<http://docs.oracle.com/cd/A58617_01/server.804/a58246/optimiz.htm>>, Retrieved Date: Jul. 19, 2012, pp. 22.

Galindolegaria, et al., "Orthogonal Optimization of Subqueries and Aggregation", Retrieved at http://www.diku.dk/OLD/undervisning/2003f/729/papers/subqueries.pdf, In Proceedings of the ACM SIGMOD International Conference on Management of Data, May 21, 2001, pp. 11.

\* cited by examiner

```
┌─────────────────────────────────────────────────────────────┐
│ Accessing a plurality of histograms for a column, each histogram containing │
│ statistics for a portion of a database table maintained at a corresponding one │
│ of a plurality of compute nodes, for each of the plurality of histograms: each │
│ step in the histogram defined by step boundaries including a non-inclusive │
│ lower boundary value and an inclusive upper boundary value, data for each │
│ step in the histogram estimating: a number of occurrences of the upper │
│ boundary value and an average number of rows per distinct value within the │
│                    step boundaries                    201   │
└─────────────────────────────────────────────────────────────┘
```

```
┌─────────────────────────────────────────────────────────────┐
│ Merging the plurality of histograms into a global histogram for the column, the │
│ global histogram including global steps defined by step boundaries including │
│ a non-inclusive lower boundary value and an inclusive upper boundary value, │
│ data for each global step estimating: a number of occurrences of the upper │
│ boundary value and a global average number of rows per distinct value within │
│       the step boundaries, including for each global step:  202 │
│                                                             │
│   ┌───────────────────────────────────────────────────┐     │
│   │  Using knowledge of a partitioning algorithm when │     │
│   │ calculating the global average number of rows per distinct │  │
│   │         value for the global step       203       │     │
│   └───────────────────────────────────────────────────┘     │
└─────────────────────────────────────────────────────────────┘
```

```
┌──────────────────────────────────┐
│   Storing the global histogram for │
│     use in query optimization    │
│                           204    │
└──────────────────────────────────┘
```

*Fig. 2*

FORMULATING GLOBAL STATISTICS FOR DISTRIBUTED DATABASES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, queries are issued against a corpus of data to facilitate targeted information retrieval from the corpus of data. A user (or even a computer system) formulates a query using constructs from a query language. A query language typically includes a number of constructs that can be grouped into different combinations to express a logical intent for retrieving data. The query is issued to a data management system for processing. The data management system translates the query into a corresponding set of compatible physical operations (sometimes and hereinafter referred to as a "query plan") for realizing the expressed logical intent. The query plan can then be executed to retrieve data from the corpus of data in accordance with the expressed logical intent. Retrieved data can be returned to the query issuer.

For example, SQL can be used to formulate a query for retrieving data from a relational database. The query is issued to a database management system that controls access to the relational database. The database management system translates the query into a query plan. The query plan is then executed to retrieve data from the relational database. The retrieved database data can be returned to the query issuer.

Using constructs of a query language, there can be any number of different ways to express the same logical intent for retrieving data. When translating a query, there can also be any number of ways to combine physical operations into a query plan for realizing an expressed logical intent. Thus, generally, different sets of physical operations can be executed to realize a logical intent that can also be expressed in different ways.

However, different query plans (i.e., different arrangements of physical operations), all of which correctly realize the same logical intent, can have different performance based on system hardware and configuration, data layout, etc. For example, one query plan for a query might execute in 5 seconds, while another query plan for the same query might execute in 15 seconds.

As such, many data management systems use a query optimizer. A query optimizer evaluates various different possible query plans for a query. The query optimizer attempts to select a better performing query plan for a query (e.g., relative to other query plans for obtaining the same result). Query optimization is typically based at least in part on statistics for data that is being queried. Without relatively accurate database statistics, lesser performing query plans can often be selected.

Some database systems are standalone (or single node) database systems where all data and optimization data is physically stored at the same machine. For a standalone database system, physical operations in a query plan are typically executed using serial, sequential processing. Query optimization is also relatively straightforward. All information for optimization, including statistics, is available in a single location. A query optimizer can relatively easily refer to the information, resulting in the selection of higher performing query plans.

Other database systems are parallel database systems. Parallel databases improve performance for tasks such as loading data and building indices. Parallel databases improve processing and input/output speeds by using multiple central processing units (CPUs) (including multi-core processors) and storage in parallel. In parallel processing, many operations are performed simultaneously, as opposed to serial, sequential processing, where operations are performed with no time overlap. Parallel databases can be implemented in different architectures including: a shared memory architecture (multiple processors share memory space and other data storage), a shared disk architecture (each processing unit has its own memory but shares other data storage), and a shared-nothing architecture (each processing unit has its own memory space and its own other data storage).

In a parallel database system, database storage is spread across a number of compute nodes. Each node stores one or more portions of a database and maintains corresponding statistics locally. Other modules (e.g., at a control node) abstract the distributed nature of the database from users such that it appears as a single unified database. However, in a parallel database system, no single node has a global view of data relevant to a query or of statistics used for query plan optimization. In some parallel environments, such as, for example, in a shared-nothing architecture, compute nodes may not even be aware of each other's existence.

Thus, in a parallel database environment, query plan optimization can be somewhat more complicated. Generally, query plan optimization can be performed at a control node. However, even the control node does not have a global view of statistics for the database.

Accordingly, statistics from each compute node can be merged to provide a control node with a global statistically view of the data in a database. One merging technique implements statistics merging for fullscan statistics over tables stored in multiple files to allow parallel scans of the file and parallel statistics generation. However, the merging process does not have information about how the information is partitioned across files, since the data is placed in files in a round-robin fashion. Lack of partitioning information can be especially problematic when attempting to merge distinct value estimates.

Simply adding distinct value estimates from multiple sets of local statistics can result in an inaccurate global distinct value estimate, such as, for example, an overestimation or an underestimation of global distinct values. Overestimation of global distinct values can result from distinct values appearing at more than one compute node causing distinct values to be counted multiple times. Underestimation of global distinct values can result from not factoring in zero occurrences of distinct values at a compute node. In a parallel environment, and especially in a shared nothing architecture, a compute node may be unaware that a distinct value exists if there are no occurrences of the distinct value at the compute node. The lack of awareness results in the compute node not reporting any information about distinct values that do not appear at the compute node.

Inaccuracies in global distinct value estimates can cause less than optimal query plans to be selected when implementing a query of a parallel database.

BRIEF SUMMARY

The present invention extends to methods, systems, and computer program products for formulating global statistics for parallel databases. A plurality of compute nodes are configured in a shared-nothing architecture. A database table is distributed across the plurality nodes in accordance with a partitioning algorithm. As such, each compute node locally maintains one or more portions of the database table in a local database instance. The database table includes one or more columns.

Global statistics are formulated for a column of the database table. A plurality of histograms are accessed for the column. Each histogram contains statistics for a portion of the database table maintained at a corresponding one of the plurality of compute nodes. For each of the plurality of histograms, each step in the histogram is defined by step boundaries including a non-inclusive lower boundary value and an inclusive upper boundary value. Data for each step in the histogram estimates: a number of occurrences of the upper boundary value and an average number of rows per distinct value within the step boundaries.

The plurality of histograms are merged into a global histogram for the column. The global histogram includes global steps defined by step boundaries including a non-inclusive lower boundary value and an inclusive upper boundary value. Data for each global step estimates a number of occurrences of the upper boundary value and a global average number of rows per distinct value within the step boundaries. For each global step, merging includes using knowledge of the partitioning algorithm when calculating the global average number of rows per distinct value for the global step. The global histogram is stored for use in query optimization.

In some embodiments, merging a plurality of histograms includes aligning the step boundaries among the plurality of histograms into global steps for the global histogram. For each global step, histogram merging also includes calculating a number of occurrences of the upper boundary value by adding the number of occurrences of upper boundary values across the plurality of histograms.

For each global step, histogram merging also includes calculating a global average number of rows per distinct value within the global step boundaries. A global average number of rows per distinct value is calculated by: (a) determining a mean compute node observed frequency of distinct values within the step boundaries and (b) calculating the probability that a particular distinct value appears at a particular node based on a partitioning algorithm. A global average row frequency is determined for the global step based on the calculated mean compute node observed frequency and the calculated probability.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flow chart of an example method for formulating global statistics for a parallel database.

DETAILED DESCRIPTION

Figure 1:
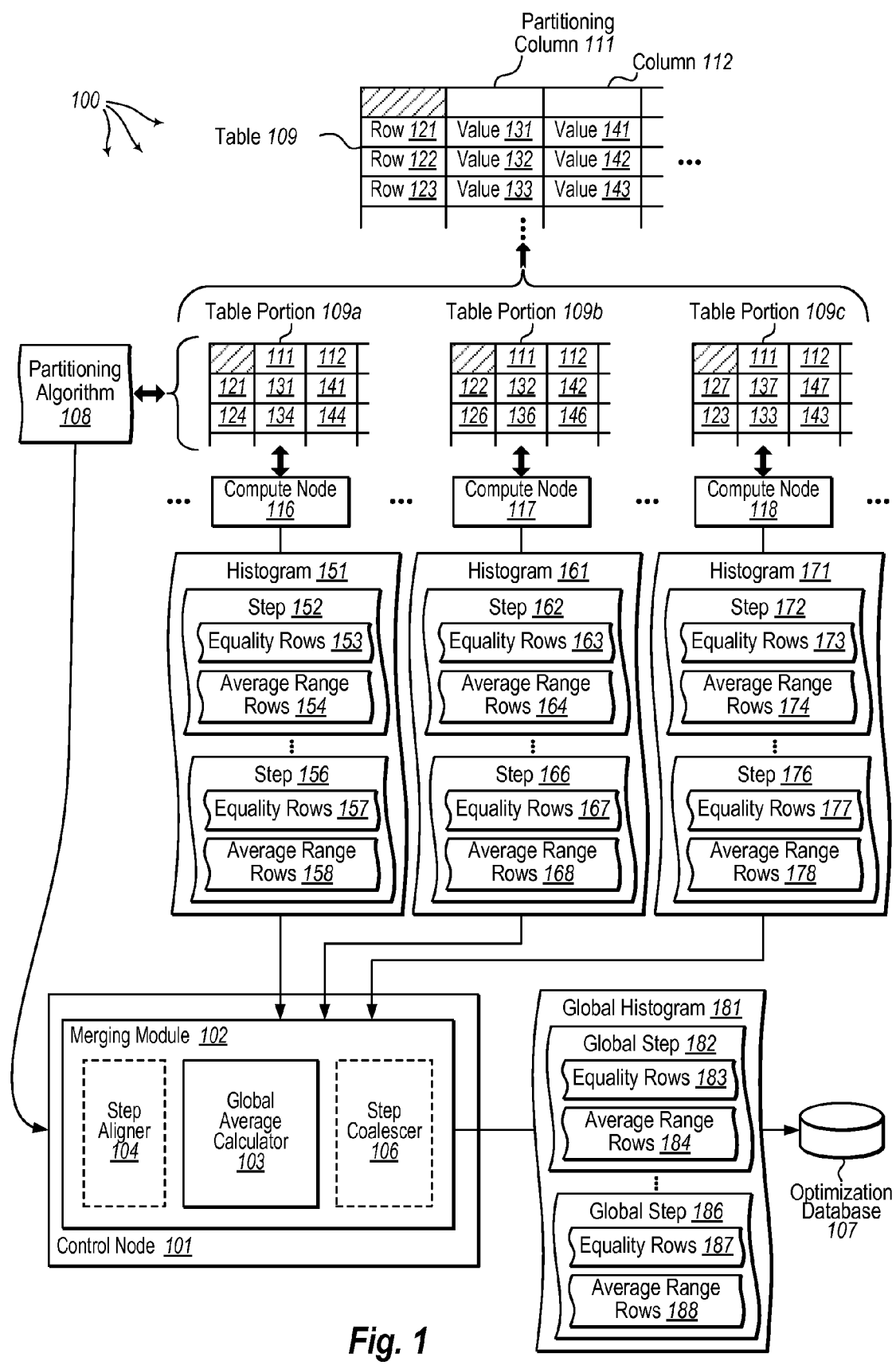
FIG. 1 illustrates an example computer architecture that facilitates for formulating global statistics for a parallel database.

The present invention extends to methods, systems, and computer program products for formulating global statistics for parallel databases. A plurality of compute nodes are configured in a shared-nothing architecture. A database table is distributed across the plurality nodes in accordance with a partitioning algorithm. As such, each compute node locally maintains one or more portions of the database table in a local database instance. The database table includes one or more columns.

Global statistics are formulated for a column of the database table. A plurality of histograms are accessed for the column. Each histogram contains statistics for a portion of the database table maintained at a corresponding one of the plurality of compute nodes. For each of the plurality of histograms, each step in the histogram is defined by step boundaries including a non-inclusive lower boundary value and an inclusive upper boundary value. Data for each step in the histogram estimates: a number of occurrences of the upper boundary value and an average number of rows per distinct value within the step boundaries.

The plurality of histograms are merged into a global histogram for the column. The global histogram includes global steps defined by step boundaries including a non-inclusive lower boundary value and an inclusive upper boundary value. Data for each global step estimates a number of occurrences of the upper boundary value and a global average number of rows per distinct value within the step boundaries. For each global step merging includes using knowledge of the partitioning algorithm when calculating the global average number of rows per distinct value for the global step. The global histogram is stored for use in query optimization.

In some embodiments, merging a plurality of histograms includes aligning the step boundaries among the plurality of histograms into global steps for the global histogram. For each global step, histogram merging also includes calculating a number of occurrences of the upper boundary value by adding the number of occurrences of upper boundary values across the plurality of histograms.

For each global step, histogram merging also includes calculating a global average number of rows per distinct value within the global step boundaries. A global average number of rows per distinct value is calculated by: (a) determining a mean compute node observed frequency of distinct values within the step boundaries and (b) calculating the probability that a particular distinct value appears at a particular node based on a partitioning algorithm. A global average row frequency is determined for the global step based on the calculated mean compute node observed frequency and the calculated probability.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description an in the following claims, a "shared-nothing architecture" is defined as an architecture where each node within the architecture functions autonomously by controlling its own memory and disk. A shared nothing-architecture can include a plurality of "compute nodes" (which may also be referred to as a "slave node"). Each compute node can store part (or all) of dataset that is distributed (or replicated) across the plurality of compute nodes. A shared nothing-architecture can also include a "control node" (which may also be referred to as a "master node"). A control node stores no used data but is where queries are submitted by users. When a query is submitted to the control node, a query optimizer can identify an appropriate query plan for each involved compute node and then submits the query to all the compute nodes. The compute nodes returns rows that satisfy the query back to the control node, which gathers the rows together from all compute nodes and sends them back to the user.

Thus, data tables within a shared-nothing architecture can be either replicated or distributed. When a table is replicated, each compute node maintains a copy of the entire table in a local database server instance. Assuming N compute nodes, N complete copies of a replicated table exist globally—one on each compute node. When a table is distributed, each compute node maintains a portion of the table in a local database server instance. Assuming N compute nodes, one complete copy of a distributed table exists globally. However, each compute node contains approximately one $N^{th}$ of the entire table. For distributed tables, the assignment of a record to a particular slave node can be performed by applying a partitioning algorithm over the value contained in a single column in the table. In some embodiments, a partitioning algorithm is a hash function.

In general, a statistics gathering framework can produce a histogram over the values contained in some (or all) of the columns in each table in the database. A histogram can be organized as an ascending series of contiguous steps that cover the range of values observed in that column. Each step is defined by a (non-inclusive) lower-boundary and an (inclusive) upper-boundary. Additionally, each step also provides a compact summary of the frequency with which values within the step range occur. For the upper-bound, there is an express estimate of the frequency of occurrence of that value. For the range between lower-bound and upper-bound, there is an estimate of the total number of rows within that range, an estimate of the total number of distinct values within that range, and also an estimate of the average frequency with which each distinct value in the range appears (i.e., the estimated total number of rows divided by the estimated total number of distinct values). Within in a shared-nothing architecture, each compute node can maintain a local histogram for values that appear in columns at the compute node.

In general, embodiments of the invention merge (combine) information in compute node level histograms to create a global histogram. Merging information from compute node histograms can include aligning histogram step boundaries across the compute node histograms. Merging information from compute node histograms can include aggregating histogram step-level information, such as, for example, equality rows and average range rows (or alternately equality rows, range rows, and distinct range rows), across the compute node histograms into a single global step. In some embodiments, the steps in a resulting global histogram can be coalesced to reduce the step count.

Within this description and the following claims "equality rows" is defined as an estimate number of rows whose column value equals the upper bound of the histogram step.

Within this description and the following claims "range rows" is defined as an estimate of the number of rows whose column value falls within a histogram step, excluding the upper bound.

Within this description and the following claims "distinct range rows" is defined as an estimated number of rows with a distinct column value within a histogram step, excluding the upper bound.

Within this description and the following claims "average range rows" is defined as an estimate of the average number of rows per distinct value within a histogram step, excluding the upper bound. Average range rows is equal to the quotient of range rows divided by distinct range rows. That is, average range rows=(range rows)/(distinct range rows).

FIG. 1 illustrates an example computer architecture 100 that facilitates formulating global statistics for a parallel database. Referring to FIG. 1, computer architecture 100 includes control node 101, optimization database 107, and compute nodes 116, 117, and 118. Control node 101, optimization database 107, and compute nodes 116, 117, and 118 can be connected to one another over (or be part of) a network, such as, for example, a Local Area Network ("LAN"), a Wide Area Network ("WAN"), and even the Internet. Accordingly, control node 101, optimization database 107, and compute nodes 116, 117, and 118 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Control node 101 and compute nodes 116, 117, and 118 are configured in a shared-nothing architecture. As such, control node 101 and each of compute nodes 116, 117, and 118 maintain separate memory (e.g., RAM) and separate storage resources (e.g., disk drives) from other nodes. Table 109 is distributed across compute nodes 116, 117, and 118, which maintain table portions 109A, 109B, and 109C respectively.

Table 109 can be distributed across compute nodes 116, 117, and 118 in accordance with partitioning algorithm 108. Partitioning algorithm 108 can be used to partition table 109 on partitioning column 111. Thus, within partitioning column 111 each value, such as, for example, values 131, 132, 133, 134, 136, and 137, can be unique. On the other hand, for non-partitioning columns, such as, for example, column 112, there is some possibility of the same value appearing in more than on record. That is, different subsets of values 141, 142, 143, 144, 146, and 147 may have the same value.

In some embodiments, partitioning algorithm 108 is a hash function used to assign records (rows) to compute nodes. The hash function can be configured such that hash values are distributed uniformly. The hash function can also be configured such that there is little, if any, bias in mapping of hash values to compute nodes. That is, if there are N compute nodes, each compute node is assigned approximately 1/N of the hash values within a table. For example, as depicted, row 121 is distributed to compute node 116, row 122 is distributed to compute node 117, and row 123 is distributed to compute node 118. Other rows, such as, for example, rows 124, 126, and 127 can also be distributed across computer nodes 116, 117, and 118 respectively. When a hash function is configured to uniformly distribute hash values with little, if any, bias in mapping of hash values, statistical patterns can emerge in compute node histograms. These statistical patterns can be used during histogram merging.

Each compute node can be configured with functionality to create local histograms for columns of table portions stored at the compute node. For example, compute node 116 can generate histogram 151 for values appearing in partitioning column 111 or column 112 of table portion 109a. Likewise, compute node 117 can generate histogram 161 for values appear in partitioning column 111 or column 112 of table portion 109b. Similarly, compute node 118 can generate histogram 171 for values appearing in partitioning column 111 or column 112 of table portion 109c.

The ellipses before, between, and after compute nodes 116, 117, and 118 represent that other compute nodes can be included in the shared-nothing architecture. These other compute nodes may store portions of other tables and/or databases. In addition to storing a portion of table 109, compute nodes 116, 117, and 118 may also store portions of these other tables and/or databases.

Control node 101 can include abstraction hardware and/or software components that abstract the distributed nature of table 109. Control node 101 can use the abstraction hardware and/or software components to present table 109 as a standalone table to a user. Thus, a user can interact with table 109 using commands compatible with a standalone database (including submitting queries).

Users or other computer systems can request retrieval of data from table 109 by submitting queries. Queries of table 109 can be received at control node 101. Queries can be submitted in a programming language, such as, for example, SQL and can express a logical intent for retrieving specified data from table 109. In general, control node 101 can select a parallel query plan that is at least better than many other parallel query plans for implementing an expressed logical intent for retrieving specified data from table 109. Control node 101 can refer to a global histogram 181 stored in optimization database 107 during query optimization.

As depicted, control node 101 includes merging module 102. In general, merging module 102 is configured to merge a plurality of compute node histograms into a global histogram. Merging module 102 further includes global average calculator 103. Global average calculator 103 is configured to use knowledge of partitioning algorithm 108 to calculate the average range rows for histogram steps. Merging module 102 can also include step aligner 104 and step coalescer 106. Step aligner 104 is configured to align steps in a plurality of compute node histograms into global steps of a global histogram. Step coalescer 106 is configured to coalesce the steps in a global histogram to reduce step count.

Optimization database 107 is configured to store global histograms for columns distributed across compute nodes in computer architecture 100. For example, global histogram 181 can be stored in optimization database 107. Control node 101 can refer to histograms stored in optimization database 107 during query optimization.

FIG. 2 illustrates a flow chart of an example method 200 for formulating global statistics for a parallel database. Method 200 will be described with respect to the components and data of computer architecture 100.

Method 200 includes accessing a plurality of histograms for the column, each histogram containing statistics for a portion of the database table maintained at a corresponding one of the plurality of compute nodes, for each of the plurality of histograms: each step in the histogram defined by step boundaries including a non-inclusive lower boundary value and an inclusive upper boundary value, data for each step in the histogram estimating: a number of occurrences of the upper boundary value and an average number of rows per distinct value within the step boundaries (201). For example, control node 101 can access histograms 151, 161, and 171. Each of histograms 151, 161, and 171 can contain statistics for table portions 109a, 109b, and 109c respectively. In some embodiments, histograms 151, 161, and 171 are for partitioning column 111. In other embodiments, histograms 151, 161, and 171 are for (non-partitioning) column 112.

Histogram 151 includes steps 152 and 156 for table portion 109a. The ellipsis within histogram 151 represents that one or more other steps for table portion 109a can also be included in histogram 151. Each of steps 152, 156, etc. can include a non-inclusive lower boundary value and an inclusive upper boundary value. For step 152, equality rows 153 estimates the occurrences of the upper boundary value of step 152. Average ranges rows 154 estimates a global average number of rows per distinct value within the step boundaries of step 152. Similarly, for step 156, equality rows 157 estimates the occurrences of the upper boundary value of step 156. Average ranges rows 158 estimates a global average number of rows per distinct value within the step boundaries of step 156.

Histogram 161 includes steps 162 and 166 for table portion 109b. The ellipsis within histogram 161 represents that one or more other steps for table portion 109b can also be included in histogram 161. Each of steps 162, 166, etc. can include a non-inclusive lower boundary value and an inclusive upper boundary value. For step 162, equality rows 163 estimates the occurrences of the upper boundary value of step 162. Average ranges rows 164 estimates a global average number of rows per distinct value within the step boundaries of step 162. Similarly, for step 166, equality rows 167 estimates the occurrences of the upper boundary value of step 166. Average ranges rows 168 estimates a global average number of rows per distinct value within the step boundaries of step 166.

Histogram 171 includes steps 172 and 176 for table portion 109c. The ellipsis within histogram 171 represents that one or more other steps for table portion 109c can also be included in histogram 171. Each of steps 172, 176, etc. can include a non-inclusive lower boundary value and an inclusive upper boundary value. For step 172, equality rows 173 estimates the occurrences of the upper boundary value of step 172. Average ranges rows 174 estimates a global average number of rows per distinct value within the step boundaries of step 172. Similarly, for step 176, equality rows 177 estimates the occurrences of the upper boundary value of step 176. Average ranges rows 178 estimates a global average number of rows per distinct value within the step boundaries of step 176.

Method 200 includes merging the plurality of histograms into a global histogram for the column, the global histogram including global steps defined by step boundaries including a non-inclusive lower boundary value and an inclusive upper boundary value, data for each global step estimating: a number of occurrences of the upper boundary value and a global average number of rows per distinct value within the step boundaries (202). For example, merging module 102 can merge histograms 151, 161, and 171 into global histogram 181. When appropriate, step aligner 104 can align step boundaries among histograms 151, 161, and 171 into steps 182, 186, etc. In some embodiments, global histogram 181 is for partitioning column 111. In other embodiments, global histogram 181 is for (non-partitioning) column 112.

Global histogram 181 includes steps 182 and 186 for table 109. The ellipsis within global histogram 181 represents that one or more other steps can also be included in global histogram 181. Each of steps 182, 186, etc. can include a non-inclusive lower boundary value and an inclusive upper boundary value. For step 182, equality rows 183 estimates the occurrences of the upper boundary value of step 182. Average ranges rows 184 estimates a global average number of rows per distinct value within the step boundaries of step 182. Similarly, for step 186, equality rows 187 estimates the occurrences of the upper boundary value of step 186. Average ranges rows 188 estimates a global average number of rows per distinct value within the step boundaries of step 186.

For each global step, merging includes using knowledge of the partitioning algorithm when calculating the global average number of rows per distinct value for the global step (203). For example, for each of global steps 182, 186, etc., global average calculator 103 can use knowledge of partitioning algorithm 108 when calculating average range rows 184, average range rows 188, etc. respectively. For example, if partitioning algorithm 108 is replication algorithm, global average calculator 103 knows that any one of histograms 151, 161, or 171 can be copied to create global histogram 181.

If partitioning algorithm 108 is a hash function, global average calculator 103 can determine that for partitioning column 111 there is no possibility the same value can be present on multiple compute nodes. Thus, in embodiments where histograms 151, 161, and 171 and global histogram 181 are for partitioning column 111, global average calculator 103 can add average range rows in histograms 151, 161, and 171 together to calculate average range rows 184, 188, etc. On the other hand, in embodiments where histograms 151, 161, and 171 and global histogram 181 are for (non-partitioning) column 112, global average calculator 103 can determine further processing for calculating average range rows, 184, 188, etc.

When appropriate, step coalescer 106 can reduce the number of steps in global histogram 181.

Method 200 includes storing the global histogram for use in query optimization (204). For example, control node 101 can store global histogram 181 in optimization database 107.

Figure 3:
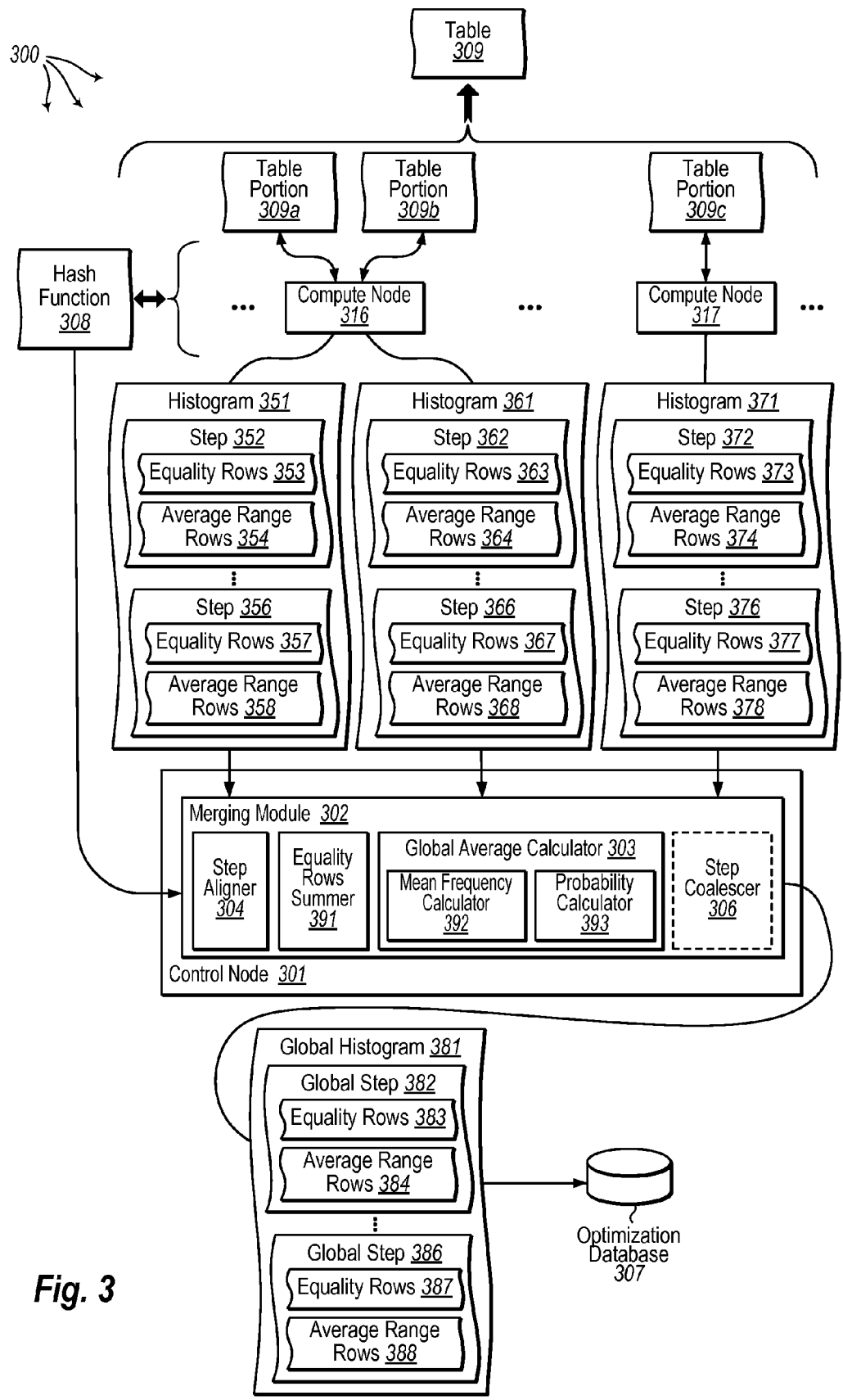
FIG. 3 illustrates an example computer architecture that facilitates for formulating global statistics for a parallel database.

FIG. 3 illustrates an example computer architecture 300 that facilitates formulating global statistics for a parallel database. Referring to FIG. 3, computer architecture 300 includes control node 301, optimization database 307, and compute nodes 316 and 317. Control node 301, optimization database 307, and compute nodes 316 and 317 can be connected to one another over (or be part of) a network, such as, for example, a Local Area Network ("LAN"), a Wide Area Network ("WAN"), and even the Internet. Accordingly, control node 301, optimization database 307, and compute nodes 316 and 317 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Control node 301 and compute nodes 316 and 317 are configured in a shared-nothing architecture. As such, control node 301 and each of compute nodes 316 and 317 maintain separate memory (e.g., RAM) and separate storage resources (e.g., disk drives) from other nodes. Table 309 is distributed across compute nodes 316 and 317. As depicted, compute node 316 maintains table portions 309a and 309b and compute node 317 maintains table portion 309c.

Table 309 can be distributed across compute nodes 316 and 317 in accordance with hash function 308. Hash function 308 can be used to partition table 309 on a partitioning column. Thus, within the partitioning column each value can be unique. On the other hand, for non-partitioning columns there is some possibility of the same value appearing in more than on record and thus at more than one computer node.

Hash function 308 can be configured such that hash values are distributed uniformly. Hash function 308 can also be configured such that there is little, if any, bias in mapping of hash values to compute nodes. That is, if there are N compute nodes, each compute node is assigned approximately 1/N of the hash values within a table. As such, statistical patterns can emerge in histograms 351, 361, and 371. These statistical patterns can be used during histogram merging.

Each compute node can be configured with functionality to create local histograms for columns of table portions stored at the compute node. For example, compute node 316 can generate histograms 351 and 361 for values appearing in a non-partitioning column of table portions 309a and 309b respectively. Likewise, compute node 317 can generate histogram 371 for values appear in the non-partitioning column of table portion 309c.

The ellipses before, between, and after compute nodes 316 and 317 represent that other compute nodes can be included in the shared-nothing architecture. These other compute nodes may store portions of other tables and/or databases. In addition to storing a portion of table 309, compute nodes 316 and 317 may also store portions of these other tables and/or databases.

Control node 301 can include abstraction hardware and/or software components that abstract the distributed nature of table 309. Control node 301 can use the abstraction hardware and/or software components to present table 309 as a standalone table to a user. Thus, a user can interact with table 309 using commands compatible with a standalone database (including submitting queries).

Users or other computer systems can request retrieval of data from table 309 by submitting queries. Queries of table 309 can be received at control node 301. Queries can be submitted in a programming language, such as, for example, SQL and can express a logical intent for retrieving specified data from table 309. In general, control node 301 can select a parallel query plan that is at least better than many other parallel query plans for implementing an expressed logical intent for retrieving specified data from table 309. Control node 301 can refer to a global histogram 381 stored in optimization database 307 during query optimization.

As depicted, control node 301 includes merging module 302. In general, merging module 302 is configured to merge a plurality of compute node histograms into a global histogram. Merging module 302 further includes global average calculator 303. Global average calculator 303 is configured to use knowledge of hash function 308 to calculate the global average range rows for histogram. Global average calculator 303 further includes mean frequency calculator 392 and probability calculator 393. Mean frequency calculator 392 is configured to calculate a mean compute node observed frequency of distinct values within step boundaries (i.e., locally observed average range rows). Probability calculator 393 is configured to calculate the probability that a particular distinct value appears at a particular node based on the partitioning algorithm.

Merging module 302 can also include step aligner 304, step coalescer 306, and equality rows summer 391. Step aligner 304 is configured to align steps in a plurality of compute node histograms into global steps of a global histogram. Equality rows summer 391 is configured to add equality rows across compute node histograms to calculate global equality rows for a global histogram. Step coalescer 306 is configured to coalesce the steps in a global histogram to reduce step count.

Optimization database 307 is configured to store global histograms for columns distributed across compute nodes in computer architecture 300. For example, global histogram 381 can be stored in optimization database 307. Control node 301 can refer to histograms stored in optimization database 307 during query optimization.

Figure 4:
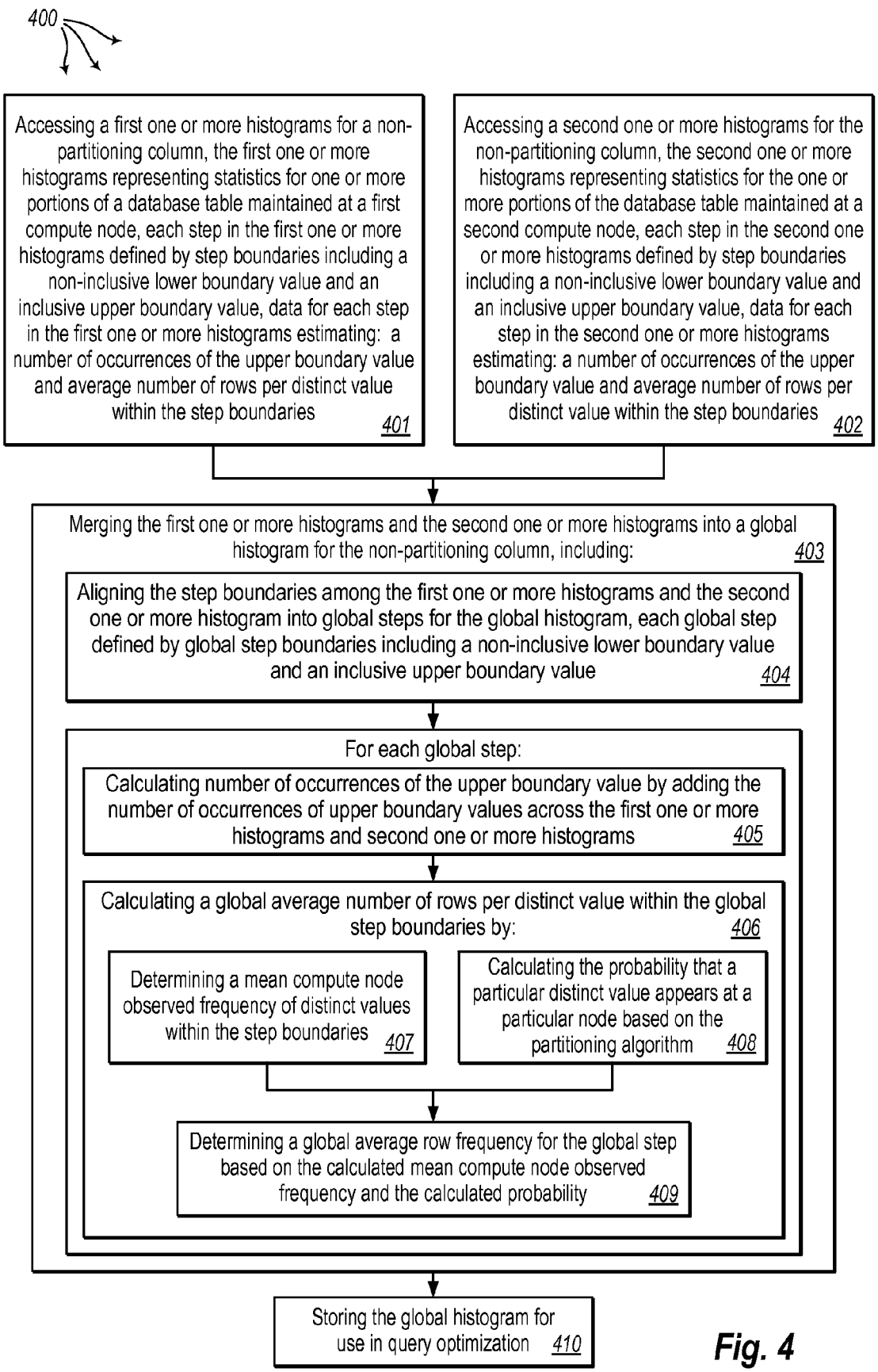
FIG. 4 illustrates a flow chart of an example method for formulating global statistics for a parallel database.

FIG. 4 illustrates a flow chart of an example method 400 for formulating global statistics for a parallel database. Method 400 will be described with respect to the components and data of computer architecture 300.

Method 400 includes accessing a first one or more histograms for a non-partitioning column, the first one or more histograms representing statistics for one or more portions of a database table maintained at a first compute node, each step in the first one or more histograms defined by step boundaries including a non-inclusive lower boundary value and an inclusive upper boundary value, data for each step in the first one or more histograms estimating: a number of occurrences of the upper boundary value and average number of rows per distinct value within the step boundaries (401). For example, compute node 301 can access histogram 351 and histogram 361. Each of histograms 351 and 361 can contain statistics for values in a non-partitioning column of table 309 within table portions 309*a* and 309*b* respectively.

Global histogram 351 includes steps 352 and 356 for table portion 309*a*. The ellipsis within global histogram 351 represents that one or more other steps for table portion 309*a* can also be included in global histogram 351. Each of steps 352, 356, etc. can include a non-inclusive lower boundary value and an inclusive upper boundary value. For step 352, equality rows 353 estimates the occurrences of the upper boundary value of step 352. Average ranges rows 354 estimates a global average number of rows per distinct value within the step boundaries of step 352. Similarly, for step 356, equality rows 357 estimates the occurrences of the upper boundary value of step 356. Average ranges rows 358 estimates a global average number of rows per distinct value within the step boundaries of step 356.

Global histogram 361 includes steps 362 and 366 for table portion 309*b*. The ellipsis within global histogram 361 represents that one or more other steps for table portion 309*b* can also be included in global histogram 361. Each of steps 362, 366, etc. can include a non-inclusive lower boundary value and an inclusive upper boundary value. For step 362, equality rows 363 estimates the occurrences of the upper boundary value of step 362. Average ranges rows 364 estimates a global average number of rows per distinct value within the step boundaries of step 362. Similarly, for step 366, equality rows 367 estimates the occurrences of the upper boundary value of step 366. Average ranges rows 368 estimates a global average number of rows per distinct value within the step boundaries of step 366.

Method 400 includes accessing a second one or more histograms for the non-partitioning column, the second one or more histograms representing statistics for the one or more portions of the database table maintained at a second compute node, each step in the second one or more histograms defined by step boundaries including a non-inclusive lower boundary value and an inclusive upper boundary value, data for each step in the second one or more histograms estimating: a number of occurrences of the upper boundary value and average number of rows per distinct value within the step boundaries (402). For example, compute node 301 can access histogram 371 Histogram 371 can contain statistics for values in the non-partitioning column of table 309 within table portion 309*c*.

Global histogram 371 includes steps 372 and 376 for table portion 309*c*. The ellipsis within global histogram 371 represents that one or more other steps for table portion 309*c* can also be included in global histogram 371. Each of steps 372, 376, etc. can include a non-inclusive lower boundary value and an inclusive upper boundary value. For step 372, equality rows 373 estimates the occurrences of the upper boundary value of step 372. Average ranges rows 374 estimates a global average number of rows per distinct value within the step boundaries of step 372. Similarly, for step 376, equality rows 377 estimates the occurrences of the upper boundary value of step 376. Average ranges rows 378 estimates a global average number of rows per distinct value within the step boundaries of step 376.

Method 400 includes merging the first one or more histograms and the second one or more histograms into a global histogram for the non-partitioning column (403). For example, merging module 302 can merge histograms 351 and 361 and histogram 371 into global histogram 381 for the non-partitioning column in table 309.

Global histogram 381 includes steps 382 and 386 for table 309. The ellipsis within global histogram 381 represents that one or more other steps can also be included in global histogram 381. Each of steps 382, 386, etc. can include a non-inclusive lower boundary value and an inclusive upper boundary value. For step 382, equality rows 383 estimates the occurrences of the upper boundary value of step 382. Average ranges rows 384 estimates a global average number of rows per distinct value within the step boundaries of step 382. Similarly, for step 386, equality rows 387 estimates the occurrences of the upper boundary value of step 386. Average ranges rows 388 estimates a global average number of rows per distinct value within the step boundaries of step 386.

Merging histograms includes aligning the step boundaries among the first one or more histograms and the second one or more histogram into global steps for the global histogram, each global step defined by global step boundaries including a non-inclusive lower boundary value and an inclusive upper boundary value (404). For example, step aligner 304 can align step boundaries among histograms 352 and 361 and histogram 371 into global steps 382, 386, etc.

Merging histograms includes for each global step calculating number of occurrences of the upper boundary value by adding the number of occurrences of upper boundary values across the first one or more histograms and second one or more histograms (405). For example, equality rows summer 391 can calculate equality rows 383 by adding the number of occurrences of equality rows 383 across histograms 351 and 361 and histogram 371. Similarly, equality rows summer 391 can calculate equality rows 387 by adding the number of occurrences of equality rows 387 across histograms 351 and 361 and histogram 371. Similar calculations can be used for equality rows in other global steps.

Merging histograms includes for each global step calculating a global average number of rows per distinct value within the global step boundaries (406). For example, global average calculator 303 can calculate average range rows 384 for global step 382. Similarly global average calculator 3030 can calculate average ranges rows 388 for global step 386.

Calculating a global average number of rows per distinct value includes determining a mean compute node observed frequency of distinct values within the step boundaries (407). For example, mean frequency calculator 392 can determine the mean frequency of distinct values for average range rows 384 observed locally at compute nodes 316 and 317. Frequency calculator 392 can analyze average range rows in steps of histograms 351, 361, and 371 to identify distinct values from histograms 351, 361, and 371 that are within the step boundaries of step 382. Similarly, mean frequency calculator 392 can determine the mean frequency of distinct values for average range rows 388 observed locally at compute nodes 316 and 317. Frequency calculator 392 can analyze average range rows in steps of histograms 351, 361, and 371 to identify distinct values from histograms 351, 361, and 371 that are within the step boundaries of step 386. Mean frequency calculator 392 can likewise determine the mean frequency for average range rows in other global observed locally at compute nodes 316 and 317. Frequency calculator 392 can analyze average range rows in steps of histograms 351, 361, and 371 to identify distinct values from histograms 351, 361, and 371 that are within the step boundaries of these other global steps.

The observed frequency of distinct values on any particular compute node, or, "mean compute node observed frequency", is the mean number of occurrences on that compute node of each distinct value present on that compute node.

Calculating a global average number of rows per distinct value includes calculating the probability that a particular distinct value appears at a particular node based on the partitioning algorithm (408). For example, probability calculator 383 can calculate the probability that a particular distinct value appears in one or more of table portions 309a, 309b, and 309c based on hash function 308.

For N compute nodes, the probability that a particular distinct value is assigned to a particular table portion is 1/N. Conversely, the probability that a particular value is not assigned to a particular table portion is (N−1)/N. Extending this, if there are R global occurrences of a particular distinct value, the probability that the particular distinct value is not assigned to a particular table portion is ((N−1)/N)^R. Conversely, the probability that a particular distinct value is assigned to a particular table portion is 1−((N−1)/N)^R. Thus, R is used to adjust the per-compute node observed value frequencies to account for values that do not appear on that compute node due to chance.

Thus, compute node local values can be converted into an analogous global value (i.e., the mean number of occurrences on that node of each distinct value in the entire dataset) by incorporating a weighting of 0 (zero) occurrences on that compute node for the percentage of distinct values that do not appear on that compute node. The sum across compute nodes of the adjusted observed value frequencies gives the correct global frequency value. The (directly observable) global number of rows can then be divided by this global frequency value to generate a relatively accurate estimate of the number of distinct values in the entire dataset.

Calculating a global average number of rows per distinct value includes determining a global average row frequency for the global step based on the calculated mean compute node observed frequency and the calculated probability (409). For example, global average calculator 303 can calculate average range rows 384 for global step 382 based on a "mean compute node observed frequency" for values within the step boundaries of global step 382 and the calculated probability that these values appear at one or more of table portions 309a, 309b, and 309c. Similarly, global average calculator 303 can calculate average range rows 388 for global step 386 based on a "mean compute node observed frequency" for values within the step boundaries of global step 386 and the calculated probability that these values appear at one or more of table portions 309a, 309b, and 309c. Global average ranges rows for other global steps can be similarly calculated.

When appropriate, step coalescer 306 can reduce the number of steps in global histogram 381.

Method 400 includes storing the global histogram for use in query optimization (410). For example, control node 301 can store global histogram 381 in optimization database 307.

In some embodiments, the value for a global average row frequency is represented by the equation:

$$R/N = \text{"mean compute node observed frequency"} * (1-(((N-1)/N)^R))$$

Which can be rearranged to:

$$N * \text{"mean compute node observed frequency"} = R/(1-(((N-1)/N)^R))$$

This later form of the equation can be useful when both N (the number of computer nodes) and "mean compute node observed frequency" are known. In some embodiments, the equation can be solved using an iterative approach. The (known) total number of rows can then be divided by R to generate the global distinct value estimate.

The following simple example illustrates application of the equation. In the example, a table with 81 records is distributed across 3 compute nodes. Within the table consider a non-partitioning column with 27 distinct values that each appear 3 times in the dataset. Since this is a non-partitioning column, the values are dispersed essentially randomly across all of the nodes. For a dispersion that is essential random, the expected distribution of values would look similar to Table 1.

TABLE 1

| Column Value | Number of Occurrences On: | | |
| --- | --- | --- | --- |
| | Slave 1 | Slave 2 | Slave 3 |
| Distinct Value 1 | 3 | 0 | 0 |
| Distinct Value 2 | 0 | 3 | 0 |
| Distinct Value 3 | 0 | 0 | 3 |
| Distinct Value 4 | 2 | 1 | 0 |
| Distinct Value 5 | 2 | 1 | 0 |
| Distinct Value 6 | 2 | 1 | 0 |
| Distinct Value 7 | 2 | 0 | 1 |
| Distinct Value 8 | 2 | 0 | 1 |
| Distinct Value 9 | 2 | 0 | 1 |
| Distinct Value 10 | 1 | 2 | 0 |
| Distinct Value 11 | 1 | 2 | 0 |
| Distinct Value 12 | 1 | 2 | 0 |
| Distinct Value 13 | 1 | 0 | 2 |
| Distinct Value 14 | 1 | 0 | 2 |
| Distinct Value 15 | 1 | 0 | 2 |
| Distinct Value 16 | 0 | 2 | 1 |
| Distinct Value 17 | 0 | 2 | 1 |
| Distinct Value 18 | 0 | 2 | 1 |
| Distinct Value 19 | 0 | 1 | 2 |
| Distinct Value 20 | 0 | 1 | 2 |
| Distinct Value 21 | 0 | 1 | 2 |
| Distinct Value 22 | 1 | 1 | 1 |
| Distinct Value 23 | 1 | 1 | 1 |
| Distinct Value 24 | 1 | 1 | 1 |
| Distinct Value 25 | 1 | 1 | 1 |
| Distinct Value 26 | 1 | 1 | 1 |
| Distinct Value 27 | 1 | 1 | 1 |

For Table 1, the observed statistics are represented in Table 2.

TABLE 2

| Statistic Level | Range Rows | Distinct Values | Average Range Rows or Observed Frequency |
| --- | --- | --- | --- |
| Compute 1 | 27 | 19 | 1.421 . . . |
| Compute 2 | 27 | 19 | 1.421 . . . |
| Compute 3 | 27 | 19 | 1.421 . . . |

At a global level, there are 81 range rows and 27 distinct range rows. So average range rows is equal to 81/27 or 3. However, each of the compute nodes is not aware of distinct values at other compute nodes or that is has zero occurrences of a one or more distinct values. As depicted, adding the number of distinct values across compute nodes overestimates the true global number of distinct values as 19×3, or 57. Over estimation of the true global number of distinct values correspondingly leads to underestimation of the true global number of average range rows as 27/19, or 1.421. In Table 1, this results from distinct values appearing on more than one compute node so many of the distinct values end up double or triple counted.

Similarly, adding the average range rows across machines overestimates the true global number of average range rows as 3×1.421, or ~4.263. Overestimating the true global number of average range rows leads to a corresponding underestimate of the true global number of distinct values 27/4.263, or 19. In Table 1, this is due to any time a distinct value does not appear on a slave node a value of 0 occurrences is not factored into the average range rows calculation (because the slave has no way to know that the distinct value exists).

Utilizing the equation:

$$3 \times 1.421 = R/(1-(((3-1)/3)^R));$$

$$4.263 = R/(1-((2/3)^R));$$

Iteratively solving the equation for R, it can be determined that R=3.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for formulating global statistics for a column of a database table by a computer system, the computer system including one or more processors and system memory, the computer system connected to a plurality of compute nodes configured in a shared-nothing architecture, a database table distributed across the plurality of compute nodes, a data partitioning algorithm defining how portions of the database table are to be partitioned across the plurality of compute nodes, each compute node in the plurality of compute nodes maintaining one or more portions of the database table in a local database instance in accordance with the data partitioning algorithm, the method comprising:

accessing a histogram from each of the plurality of compute nodes, each histogram containing statistics for a portion of the column maintained at the compute node in accordance with the data partitioning algorithm, for each accessed histogram: each step in the histogram defined by step boundaries including a non-inclusive lower boundary value and an inclusive upper boundary value, data for each step in the histogram estimating: a number of occurrences of the upper boundary value and an average number of rows per distinct value within the step boundaries;

merging the histograms accessed from each of the plurality of compute nodes into a global histogram for the column, the global histogram including global steps defined by step boundaries including a non-inclusive lower boundary value and an inclusive upper boundary value, data for each global step estimating: a number of occurrences of the upper boundary value and a global average number of rows per distinct value within the step boundaries, including for each global step:

calculating number of occurrences of the upper boundary value by adding the number of occurrences of upper boundary values across the histograms; and using knowledge of the data partitioning algorithm when calculating the global average number of rows per distinct value for the global step including:

determining a mean compute node observed frequency of distinct values within the step boundaries;

calculating the probability that a particular distinct value appears at a particular node based on the data partitioning algorithm; and determining a global average row frequency for the global step based on the calculated mean compute node observed frequency and the calculated probability; and storing the global histogram for use in query optimization.

2. The method of claim 1, wherein using knowledge of the data partitioning algorithm when calculating a global average number of rows per distinct value comprises accounting for at least one distinct value being counted at two or more compute nodes.

3. The method of claim 1, wherein using knowledge of the data partitioning algorithm when calculating a global average number of rows per distinct value comprises accounting for at least one distinct value not appearing at one or more compute nodes.

4. The method of claim 1, wherein merging the first histogram and the second histogram into a global histogram for the column comprises merging the first histogram and the second histogram into a global histogram for a partitioning column.

5. The method of claim 4, wherein using knowledge of the data partitioning algorithm when calculating a global average number of rows per distinct value comprises using knowledge that distinct values are uniformly distributed within the partitioning column such that the number of distinct values observed across the plurality of nodes can be added together to calculate the global number of distinct values for the partitioning column.

6. The method of claim 1, wherein merging the first histogram and the second histogram into a global histogram for the column comprises merging the first histogram and the second histogram into a global histogram for a non-partitioning column.

7. The method of claim 6, wherein merging the first histogram and the second histogram into a global histogram for a non-partitioning column comprise determining a global average row frequency for each global step.

8. The method of claim 1, wherein merging the first histogram and the second histogram into a global histogram for the column comprises aligning the step boundaries between the plurality of histograms into the global steps.

9. The method of claim 1, further comprising coalescing the global steps to reduce the step count.

10. A computer program product for use at a computer system, the computer system connected to a plurality of compute nodes configured in a shared-nothing architecture, a database table distributed across the plurality of compute nodes, a data partitioning algorithm defining how portions of the database are to be partitioned across the plurality of compute nodes, each compute node in the plurality of compute nodes maintaining one or more portions of the database table in a local database instance in accordance with the data partitioning algorithm, the computer program product for implementing a method for formulating global statistics for a column of the table, the computer program product comprising one or more computer storage devices having stored thereon computer-executable instructions that, when executed at a processor, cause the computer system to perform the method, including the following:

access a histogram from each of the plurality of compute nodes, each histogram containing statistics for a portion of the column maintained at the compute node in accordance with the data partitioning algorithm, for each accessed histogram: each step in the histogram defined by step boundaries including a non-inclusive lower boundary value and an inclusive upper boundary value, data for each step in the histogram estimating: a number of occurrences of the upper boundary value and an average number of rows per distinct value within the step boundaries;

merge the histograms accessed from each of the plurality of compute nodes into a global histogram for the column, the global histogram including global steps defined by step boundaries including a non-inclusive lower boundary value and an inclusive upper boundary value, data for each global step estimating: a number of occurrences of the upper boundary value and a global average number of rows per distinct value within the step boundaries, including for each global step:

calculate number of occurrences of the upper boundary value by adding the number of occurrences of upper boundary values across the histograms; and use knowledge of the data partitioning algorithm when calculating the global average number of rows per distinct value for the global step including:

determine a mean compute node observed frequency of distinct values within the step boundaries;

calculate the probability that a particular distinct value appears at a particular node based on the data partitioning algorithm; and determine a global average row frequency for the global step based on the calculated mean compute node observed frequency and the calculated probability; and store the global histogram for use in query optimization.

11. The computer program product of claim 10, wherein computer-executable instructions that, when executed, cause the computer system to use knowledge of the data partitioning algorithm when calculating a global average number of rows per distinct value comprise computer-executable instructions that, when executed at a processor, cause the computer system to account for at least one distinct value being counted at two or more compute nodes.

12. The computer program product of claim 10, wherein computer-executable instructions that, when executed, cause the computer system to use knowledge of the data partitioning algorithm when calculating a global average number of rows per distinct value comprise computer-executable instructions that, when executed at a processor, cause the computer system to account for at least one distinct value not appearing at one or more compute nodes.

13. The computer program product of claim 10, wherein computer-executable instructions that, when executed, cause the computer system to merge the first histogram and the second histogram into a global histogram for the column comprise computer-executable instructions that, when executed, cause the computer system to merge the first histogram and the second histogram into a global histogram for a partitioning column.

14. The computer program product of claim 10, wherein computer-executable instructions that, when executed, cause the computer system to merge the first histogram and the second histogram into a global histogram for the column comprise computer-executable instructions that, when executed, cause the computer system to merge the first histogram and the second histogram into a global histogram for a non-partitioning column.

15. The computer program product of claim 10, wherein computer-executable instructions that, when executed, cause the computer system to merge the first histogram and the second histogram into a global histogram for the column comprise computer-executable instructions that, when executed, cause the computer system to align the step boundaries between the plurality of histograms into the global steps; and further comprising:

computer-executable instructions that, when executed, cause the computer system to reduce the step count in the global histogram by coalescing the global steps.

16. A method for formulating global statistics for a non-partitioning column of the table by a computer system, the computer system including one or more processors and system memory, the computer system connected to a first compute node and a second compute node configured in a shared-nothing architecture, a database table distributed across the first node and the second node, a data partitioning algorithm defining how portions of the database table are to be partitioned across the first and second compute nodes, each of the first compute node and the second compute node maintaining one or more portions of a database table in a local database instance in accordance with the data partitioning algorithm, the method comprising:

accessing a first one or more histograms for the non-partitioning column, the first one or more histograms representing statistics for the one or more portions of the column maintained at the first compute node in accordance with the data partitioning algorithm, each step in the first one or more histograms defined by step boundaries including a non-inclusive lower boundary value and an inclusive upper boundary value, data for each step in the first one or more histograms estimating: a number of occurrences of the upper boundary value and average number of rows per distinct value within the step boundaries;

accessing a second one or more histograms for the non-partitioning column, the second one or more histograms representing statistics for the one or more portions of the column maintained at the second compute node in accordance with the data partitioning algorithm, each step in the second one or more histograms defined by step boundaries including a non-inclusive lower boundary value and an inclusive upper boundary value, data for each step in the second one or more histograms estimating: a number of occurrences of the upper boundary value and average number of rows per distinct value within the step boundaries;

merging the first one or more histograms and the second one or more histograms into a global histogram for the non-partitioning column, including:

aligning the step boundaries among the first one or more histograms and the second one or more histogram into global steps for the global histogram, each global step defined by global step boundaries including a non-inclusive lower boundary value and an inclusive upper boundary value; and for each global step:

calculating number of occurrences of the upper boundary value by adding the number of occurrences of upper boundary values across the first one or more histograms and second one or more histograms; and using knowledge of the data partitioning algorithm when calculating a global average number of rows per distinct value within the global step boundaries including:

determining a mean compute node observed frequency of distinct values within the step boundaries;

calculating the probability that a particular distinct value appears at a particular node based on the data partitioning algorithm; and determining a global average row frequency for the global step based on the calculated mean compute node observed frequency and the calculated probability; and storing the global histogram for use in query optimization.

17. The method of claim 16, further comprising coalescing the global steps to reduce the step count.

18. The method of claim 16, wherein calculating the probability that a particular distinct value appears at a particular node based on the data partitioning algorithm comprises calculating the probability that a particular distinct value appears at a particular node based on a hashed based data partitioning algorithm.

19. The method of claim 16, wherein the first compute node and the second compute node are the same compute node.

20. The method of claim 16, wherein the first compute node and the second compute node are different compute nodes.

* * * * *